United States Patent [19]
Dolch

[11] 3,913,023
[45] Oct. 14, 1975

[54] FAIL-SAFE LOGIC CIRCUIT ARRANGEMENT FOR USE IN RAILWAY SIGNALLING SYSTEMS

[75] Inventor: Klaus Dolch, Ludwigsburg, Germany

[73] Assignee: International Standard Electric Corporation, New York, N.Y.

[22] Filed: Mar. 27, 1974

[21] Appl. No.: 455,477

[52] U.S. Cl. ............... 328/133; 246/1 R; 324/83 D; 307/216; 328/120; 340/167 R; 340/248 P; 340/253 P
[51] Int. Cl.² ..................... B61L 23/00; H03B 3/04
[58] Field of Search .......... 328/120, 133; 324/83 D; 340/167 R, 248 P, 253 P, 253 Y; 307/216; 246/1 R

[56] References Cited
UNITED STATES PATENTS

| | | | |
|---|---|---|---|
| 3,482,132 | 12/1969 | Ende | 324/83 D X |
| 3,519,929 | 7/1970 | Ault | 328/133 X |
| 3,609,408 | 9/1971 | Motisher | 328/133 X |
| 3,663,956 | 5/1972 | Purdy et al. | 328/133 X |
| 3,795,867 | 3/1974 | Jones | 328/120 X |

OTHER PUBLICATIONS
Frankeny et al., "Recorded Signal Detection"—IBM Technical Disclosure Bulletin, Vol. 15, No. 1, June 1972, pp. 22–23.

*Primary Examiner*—Alfred L. Brody
*Attorney, Agent, or Firm*—John T. O'Halloran; Menotti J. Lombardi, Jr.

[57] ABSTRACT

A fail-safe logic circuit arrangement for use in railway signalling systems having a number of binary control signals, with two such signals assigned to each control operation, comprising two parallel cascades of exclusive-or elements, each having two inputs and one output and a monitoring device. A square-wave test signal is applied to the beginning of the two cascades continuing through the cascades where the output of one cascade element is connected to the input of the following element. The binary control signals are simultaneously applied in pairs, in accordance with their corresponding control operations, to the other inputs of the exclusive-or elements, each of which is arranged in a different cascade. False control signals change the phase relation of the test signals, whereby the signals occurring in the monitoring device depend on the phase difference between the test signals appearing at the outputs of the cascades.

5 Claims, 2 Drawing Figures

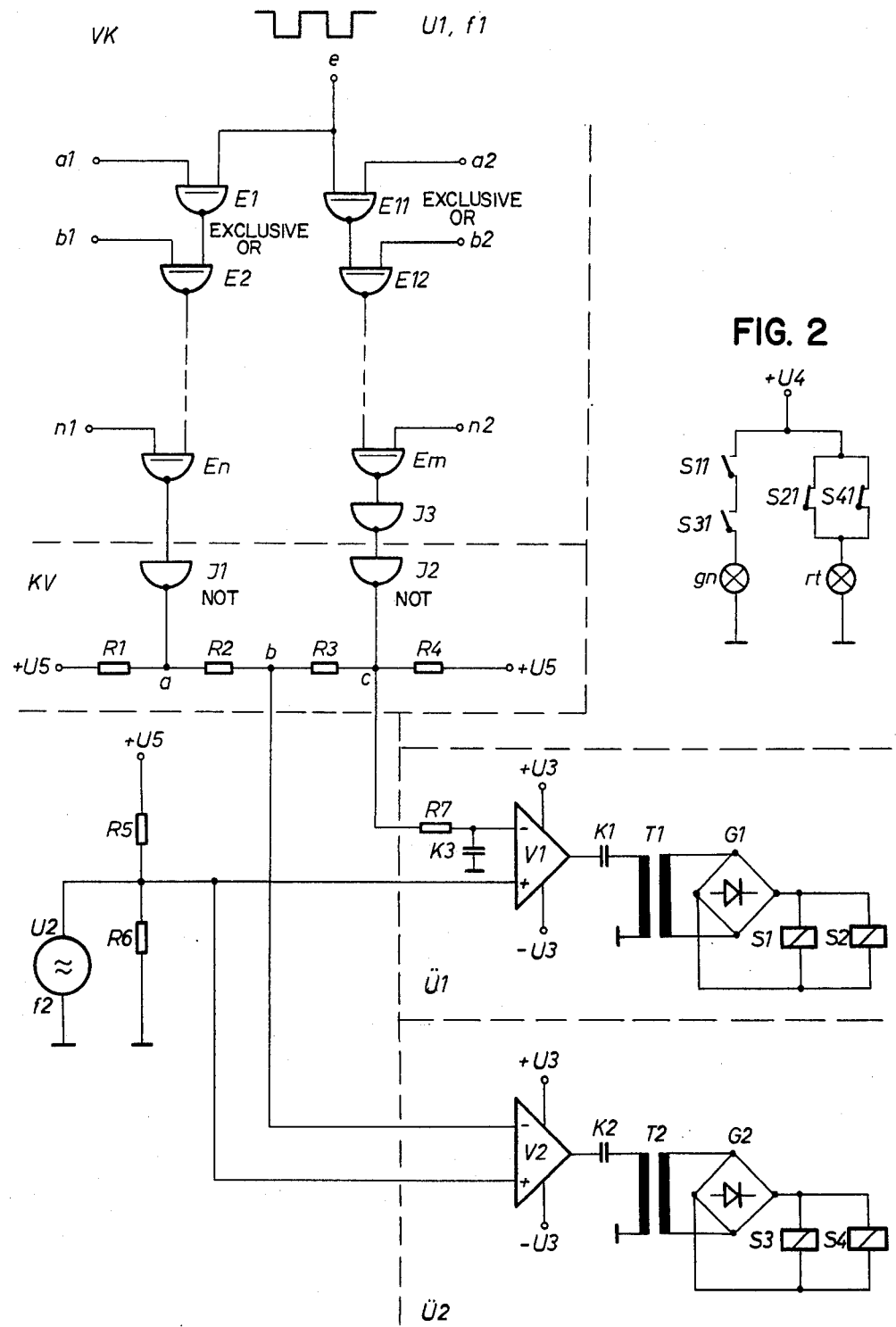

FAIL-SAFE LOGIC CIRCUIT ARRANGEMENT FOR USE IN RAILWAY SIGNALLING SYSTEMS

BACKGROUND OF THE INVENTION

The present invention relates to a fail-safe logic circuit arrangement for monitoring any number of binary control signals assigned in pairs to a control operation, particularly for use in railway signalling systems, wherein cascade-connected exclusive-or stages with a following monitoring device are used and wherein a square-wave voltage is applied as test signal from one input of the exclusive-or stage at the beginning of the cascade through all exclusive-or stages, with two binary signals being capable of influencing said test voltage in each exclusive-or stage.

To meet stringent safety requirements in systems such as railway signalling systems, it is known to duplicate the control and switching facilities for important control operations. For one control operation, for example, use is made of two control circuits with one relay each, one relay being operated with closed-circuit current, and the other with open-circuit current. These relays must be controlled with complementary control signals.

Such circuit arrangements are expensive because two relays are necessary for each control operation.

To reduce this expense and rapidly detect malfunctions caused by inner and outer faults in the systems, in a known arrangement for monitoring loads, amplifiers, and functional elements ("Ueberwachungsbausteine fuer fehler-sichere Signalverarbeitung," Techn. Mitt. AEG-Telefunken 58 (1968) 3), two complementary check signals are simultaneously applied to the two check inputs of each exclusive-or checking stage. The checking stages are connected in cascade, with the test signal output of one stage connected to the test signal input of the stage following in the cascade. A square-wave voltage injected via the test signal input of the first checking stage is applied as test signal through all exclusive-or stages and from the test signal output of the last checking stage of the cascade to a monitoring device. The presence of the test signal in the monitoring device is evaluated as a criterion for the trouble-free operation of the facilities to be monitored. A malfunction or an error within the range of the facilities to be supervised prevents the test signals from being passed on by the respective checking stage to the following checking stage or to the monitoring device.

In this known arrangement, complementary check signals are necessary. Since, in addition, the two check signals assigned to a facility to be supervised are processed in only one test signal circuit, expensive discrete components, i.e., transistors, diodes, and resistors, are used in the checking stages to insure that monitoring errors are excluded as far as possible.

SUMMARY OF THE INVENTION

It is the purpose of the invention to rapidly and reliably detect false control signals with the lowest possible investment in circuitry.

The invention has for its object to provide a fail-safe logic circuit arrangement with integrated building blocks wherein any number of binary control signals assigned in pairs to each control operation can be reliably monitored in a low-cost comparator logic, using cascade-connected exclusive-or stages.

The invention is characterized in that the cascade of exclusive-or stages represents a comparator cascade arrangement consisting of two parallel cascades of exclusive-or elements each having two inputs and one output, the square-wave voltage being simultaneously applied to one of the two inputs of the exclusive-or elements at the beginning of each cascade and the binary control signals being simultaneously applied in pairs, in accordance with their assignment to the control operations, to the still free inputs of exclusive-or elements each of which is part of a different cascade, and that between the comparator cascade arrangement and the monitoring device there is inserted a cascade-comparing arrangement in which, depending on the phase difference between the square-wave voltages developed at the outputs of the exclusive-or elements at the ends of the cascades, an electrical criterion is produced which is evaluated in the following monitoring device.

In a preferred embodiment of the invention, the comparison of the voltages developed at the outputs of the exclusive-or elements at the ends of the cascades may advantageously be performed by using for the cascade-comparing arrangement a symmetrical voltage divider with at least four elements and applying to the two free ends of the voltage divider the same potential of a d.c. voltage, the monitoring device being connected to the center tap of the voltage divider and two further terminals of the voltage divider each being provided with one of the two square-wave voltages developed at the outputs of the exclusive-or elements at the ends of the cascades.

The exclusive-or elements in the cascades may be designed uniformly and for low power if, according to the invention, each of the two square-wave voltages injected into the cascade-comparing arrangement is applied to a not-element having an open collector, with the voltage-divider elements, which are resistors, forming the collector resistors of the not-elements.

To be able to reliably evaluate the criterion entered into the monitoring device, it is advantageous to apply the criterion to one of two antiphasal inputs of an operational amplifier to whose second input is applied a d.c. voltage having an a.c. voltage of a particular frequency superimposed thereon, and to evaluate the d.c. voltage developed at the output of the operational amplifier.

The presence of the square-wave voltage used as test signal is advantageously monitored by connecting one of the outputs of the exclusive-or elements at the ends of the cascades via an integrating resistor/capacitor arrangement to one input of an additional operational amplifier, the d.c. voltage with the a.c. voltage superimposed thereon being applied to the other input of the amplifier.

In a further embodiment of the invention, it is advantageous to connect to the output of each operational amplifier a resonant circuit consisting of a capacitor and a transformer, said resonant circuit being tuned to the frequency of the a.c. voltage superimposed on the d.c. voltage, and to evaluate the amplitudes of the a.c. voltages appearing across said transformers.

BRIEF DESCRIPTION OF THE DRAWING

FIG. 1 shows the circuit of the instant invention wherein the broken lines delimit associated circuit portions, namely the comparator cascade arrangement VK, the cascade-comparing arrangement KV, the monitoring devices Ü1 and Ü2; and FIG. 2 is a schematic representation of the indicating circuit of FIG. 1.

DESCRIPTION OF THE PREFERRED EMBODIMENT

The comparator cascade arrangement VK consists of a first and a second cascade of exclusive-or elements (E1 – E$n$, E11 – E$m$) the cascades may contain any number of elements but at least as many as there are control signals provided to control signal inputs ($a$1 – $n$1, $a$2 – $m$2) to be monitored. Of the exclusive-or elements in the first cascade, only the elements E1, E2 and E$n$, and of the second cascade only the elements E11, E12, and E$m$ are shown, with two exclusive-or elements, e.g., the elements E1 and E11, E2, and E12, E$n$ and E$m$, forming a stage for monitoring two binary control signals assigned to a control operation. A square-wave voltage U1 with the frequency $f$1 is passed as test signal through the cascade-connected exclusive-or elements by being applied to inputs $e$ of each of the elements E1 and E11 at the beginning of the cascades, which inputs may be interconnected.

The exclusive-or elements are made using integrated circuit techniques and have two inputs and one output; two or more of them may be combined in an intergrated building block. The output of an exclusive-or element, e.g., E1, is connected to one input of the element following in the cascade, e.g., E2.

The two binary control signals assigned to a control operation are applied for comparison via the free inputs $a$1 and $a$2, $b$1 and $b$2, $n$1 and $n$2, to the exclusive-or stages E1 and E11, E2 and E12, E$n$ and E$m$, respectively, the binary control signals being d.c. signals which are produced as like signals by duplicated equipment such as data processing machines.

If the two control signals to be compared are in the 0 state and are applied, for example, to the inputs $a$1 and $a$2, the test signal applied to the inputs $e$ of the exclusive-or gates E1 and E2 and corresponding to the square-wave voltage U1 with the frequency $f$1 is not shifted in phase in either of the two exclusive-or elements.

If, however, the control signals applied to the inputs $b$1 and $b$2 of the exclusive-or elements E2 and E12 are in the 1 state, the test signals are subjected to a 180° phase shift in these two elements.

In both cases, i.e., if both control signals assigned to a control operation are in the 0 or 1 state, the phase difference between the test signal in one cascade and the test signal in the other cascade at the outputs of the respective exclusive-or elements is the same as that between the test signals applied to the inputs of these elements.

If, however, the states of two control signals to be compared differ, the test signal is subjected to a 180° phase shift in one exclusive-or element and to no phase shift in the other element, so that in case of in-phase test signals at the inputs of the respective exclusive-or elements the test signals provided at the outputs are in antiphase.

Depending on the phase difference between the test signals applied to the outputs of the exclusive-or elements E$n$ and E$m$ at the ends of the two cascades, erroneous control signals can now be recognized and indicated on time.

In the embodiment illustrated in the drawing, in normal, trouble-free operation, in-phase test signals with the voltage U1 and the frequency $f$1 are applied to the two cascades at inputs $e$ while the exclusive-or elements E1 and E11, E2 and E12, etc., which are arranged in stages, are provided with the binary control signals to be compared and applied to inputs $a$1 $a$2, and $b$1 $b$2, and being in the same state "0" or "1".

Thus, the phase difference between the test signals passed through the two cascades is 0° if no control signal is false, and the square-wave voltages applied to the outputs of the cascades and having the frequency $f$1 are in phase.

In contrast, these square-wave voltages at the outputs of the cascades are in antiphase if the phase difference between the two test signals is 180° due to the application of a false control signal.

To determine the phase difference between the test signals appearing at the outputs of the cascades, the square-wave voltages with the frequency $f$1 are applied from the outputs of the two cascades to the terminals $a$ and $c$ of a voltage divider provided in the cascade-comparing arrangement KV and consisting of four resistors R1 to R4, with the phase of one voltage being shifted by 180° through a not-element J3, and the two voltages then being passed through not-elements (open-collector elements) J1 and J2, respectively.

In this case, the resistors R1 and R4 of the symmetrical voltage divider are the load resistors of the not-elements J1 and J2.

Furthermore, each feeding point of the voltage divider has the potential + of a d.c. voltage source U5 connected thereto.

The resistors R1 to R4 of the symmetrical voltage divider are proportioned so that the values of the resistors R2 and R3 are considerably higher than those of the resistors R1 and R4; for example $R2 \approx 10 \cdot R1$, and $R3 \approx 10 \cdot R4$.

In normal operation, i.e. if the binary control signals to be compared in pairs are in the same states 0 or 1, square-wave voltages with the frequency $f$1 are applied in antiphase to the terminals $a$ and $c$ of the voltage divider, so that a voltage with a constant potential of nearly half the supply voltage of the integrated circuits is developed at the center terminal $b$ of the voltage divider.

This d.c. voltage at the center terminal $b$ is now applied to one of two antiphasal inputs of the differential amplifier (operational amplifier) V2, which is contained in the monitoring device Ü2. The other input of this amplifier V2 is provided with a d.c. voltage having an a.c. voltage U2 superimposed thereon. In normal operation, the magnitude of this d.c. voltage corresponds to the d.c. voltage applied from the center terminal $b$ of the voltage divider to the other input of the amplifier and is adjusted, for example, by the voltage divider with the resistors R5 and R6. Superimposed on the d.c. voltage is the a.c. voltage U2 generated by a generator and having the frequency $f$2, the amplitude of the voltage U2 being considerably smaller than the d.c. voltage. Thus, in normal operation, an a.c. voltage with the frequency $f2$ appears at the output of the differential amplifier V2.

In case a false control signal occurs, i.e., if, in a stage, the control signals to be compared do not agree, square-wave voltages with the frequency $f1$ are applied in phase from the outputs of the cascades to the terminals $a$ and $c$ of the voltage divider. At the center terminal $b$ of the voltage divider, this results in an a.c. voltage with the frequency $f1$ whose amplitude is nearly twice as large as the d.c. voltage appearing at the center terminal $b$ in case of normal operation. As a consequence, an a.c. voltage with the frequency $f1$ is developed at the output of the differential amplifier V2.

The a.c. voltages developed with different frequencies $f1$ and $f2$ at the output of the differential amplifier V2 can now be evaluated in fail-safe arrangements, a false control signal being indicated and/or the alarm being given if the a.c. voltage with the frequency $f1$ appears.

To evaluate these a.c. voltages with the frequencies $f1$ and $f2$, respectively, a series resonant circuit consisting of the capacitor K2 and the transformer T2 is advantageously connected to the output of the differential amplifier V2, the resonant circuit being tuned to the frequency $f2$ and the necessary inductance of the resonant circuit being determined by the proportioning of the transformer T2.

In normal operation, in which the a.c. voltage with the frequency $f2$ is applied via the differential amplifier V2 to the resonant circuit, a higher voltage will be developed across the transformer T2. This voltage is taken from the secondary winding of the transformer and used, via a rectifier G2, to actuate switching means. For example, the d.c. voltage may be used to operate the relays S3 and S4.

If a false binary control signal is injected into the circuit arrangement, the voltage with the frequency $f1$ will be applied through the differential amplifier to the resonant circuit. Since the frequency $f1$ is chosen to be much lower than the frequency $f2$, the d.c. voltage from the transformer to the relay is so low that the relays S3 and S4 safely release, their contacts S31 and S41 in the indicating device shown in FIG. 2 changing to the position shown in the drawing.

This logic circuit arrangement is already fail-safe. It may also be appropriate, however, to monitor the absence of the voltage with the frequency $f1$, which is used as test signal. To this end, a monitoring device Ü1 may be provided which corresponds in its design to the monitoring device Ü2 and contains the same components, i.e., the differential amplifier V1, supplied with the d.c. voltage with the potentials + U3 and − U3, the resonant circuit consisting of the capacitor K1 and the transformer T1 and tuned to the frequency $f2$, the rectifier G1, and the relays S1 and S2 with their contacts S11 and S21. One input of the differential amplifier V1 is again provided with the d.c. voltage on which the voltage U2 with the frequency $f2$ is superimposed. The other input of the amplifier is connected to the terminal $a$ or $c$ of the symmetrical voltage divider via an integrating resistor/capacitor arrangement comprising the resistor R7 and the capacitor K3 are proportioned so that the square-wave voltage with the frequency f1, transmitted from the terminal, e.g., $c$, is converted into a d.c. voltage whose magnitude nearly corresponds to that of the d.c. voltage applied to the other input of the differential amplifier.

In this case, i.e. if the test signal is present, the a.c. voltage with the frequency $f2$ will appear at the output of the differential amplifier V1; converted into a d.c. voltage, this a.c. voltage operates the relays S1 and S2.

If the test signal fails to appear, the d.c. voltage potential at the respective input of the differential amplifier V1 is changed so that the transmission of the a.c. voltage with the frequency $f2$ is suppressed and the relays S1 and S2 release. Their contacts S11 and S21 change to the position shown in the drawing.

In the embodiment shown in the drawing, the relays S1 to S4 are not energized. In the indicating device A, the circuit from the potential + of the power source U4 via the contacts S21 and S41 and the red lamp $rt$ to ground potential—is closed. If the lamp $rt$ is lighted, it indicates an error or fault in the system.

In normal operation, the relays S1 and S4 in the monitoring devices Ü1 and Ü2 are energized, with the contacts S11 and S31 closed, and the contacts S21 and S41 open. The circuit of the red lamp rt is thus interrupted by the contacts S21 and S41, and the circuit of the green lamp $gn$ is closed via contacts S11 and S31. The lighting of the green lamp gn indicates the faultless operation of the system portion being monitored.

If the comparator logic determines a false control signal, the relays S3 and S4 in the monitoring device Ü2 will release. The contact S31 interrupts the circuit of the green lamp gn, and the contact S41 turns on the red lamp.

To achieve a differentiated indication of the normal case, of a false control signal, and of the absence of the test signal, these acoustic and/or optical criteria can be selected by suitably arranging the contacts of the relays S1 to S4.

It is also possible to eliminate the need for the not-element J3, contained in one cascade and used to invert the test signal, if the square-wave voltage U1 with the frequency $f1$ is applied to the inputs of the cascades in antiphase.

Although the fail-safe logic circuit arrangement of this invention has been directed to a specific application, namely, railway signalling systems, this is by example only and is no way intended to limit the scope of the invention, since other uses and applications for the inventive circuit exist in addition to the railway signalling application disclosed herein.

What is claimed is:

1. An improved fail-safe logic circuit for use in comparing binary control signals in railway signalling systems comprising:

a plurality of pairs of first and second exclusive-or elements, an input of one of said first elements coupled with an input of one of said second elements and to a source of square-wave test signals;

an output of each of said first exclusive-or elements connected to an input of another of said first elements in a continuing series of said first elements and an output of each of said second elements connected to an input of another of said second elements in a continuing series of said second elements;

a plurality of pairs of binary control signals, one of said signals from each said pair of binary control signals connected to one input of each of said first exclusive-or elements and another signal from each of said pairs of binary control signals connected to another input of each of said exclusive-or elements;

a pair of first and second not elements, an input of said first not element coupled with an output of one of said first exclusive-or elements and an input of said second not element coupled with an output of one of said second exclusive-or elements;

first, second, third and fourth resistors connected in series and to a source of d.c. voltage at said first resistor and to a source of d.c. voltage at said fourth resistor, an output of said first not element coupled between said first and second resistors, and an output of said second not element coupled between said third and fourth resistors;

a first differential amplifier, one input of said first differential amplifier coupled with said third and fourth resistors and said output of said second not element, another input of said first differential amplifier coupled with an a.c. voltage source; and a second differential amplifier having one input coupled between said second and third resistors and another input coupled with said other input of said first differential amplifier and said source of a.c. voltage;

whereby when said pairs of binary control signals applied to inputs of said exclusive-or elements are in the same logic state an output signal appears at an output of said second differential amplifier and when said pairs of binary control signals applied to exclusive-or elements are not in the same logic state a signal appears at an output of said first differential amplifier.

2. The improved fail-safe logic circuit of claim 1 further comprising first signal means coupled with an output of said first differential amplifier for providing a first signal when said pairs of binary control signals are in different logic states, and second signal means coupled with an output of said second differential amplifier for providing a second signal when said binary control signals are in the same logic state.

3. The improved fail-safe logic circuit of claim 2 wherein said first signal means comprises a bridge rectifier coupled with an output of said first differential amplifier and a first indicating lamp coupled with said first rectifier by means of a first pair of relays; and said second signal means comprises a second rectifier coupled with an output of said second differential amplifier and a second indicating lamp coupled with said second rectifier by means of a second pair of relays.

4. The improved fail-safe logic circuit of claim 3 further including an integrating resistor and a capacitor coupled between said first input of said first differential amplifier and an output of said second not element for monitoring said square-wave test signal.

5. The improved fail-safe logic circuit of claim 3 further including a first resonant circuit consisting of a first capacitor and a first transformer coupled between said first rectifier and an output of said first differential amplifier, and a second resonant circuit consisting of a second capacitor and a second transformer coupled between said second rectifier and an output of said second differential amplifier, said first and second resonant circuits tuned to a frequency of said a.c. voltage source said first resonant circuit thereby becoming operative when said binary control signals are not in the same logic states and said second resonant circuit becoming operative when said binary control signals are in the same logic state.

* * * * *